United States Patent
Solana De Quesada

(10) Patent No.: US 6,775,228 B1
(45) Date of Patent: Aug. 10, 2004

(54) ATM NETWORK ELEMENT AND METHOD FOR AUTOMATIC PROTECTION SWITCHING OF A TRANSMISSION CONVERGENCENCE SUBLAYER SUBNETWORK CONNECTION

(75) Inventor: Juan Ignacio Solana De Quesada, Ratingen (DE)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/577,698

(22) Filed: May 22, 2000

(30) Foreign Application Priority Data

May 28, 1999  (EP) ............................................. 99110388

(51) Int. Cl.⁷ ............................. G01R 31/08; H04L 1/00
(52) U.S. Cl. ................... 370/217; 370/225; 340/825.01
(58) Field of Search ................ 370/216–228; 714/1, 2, 4, 41–48; 340/825.01; 709/251, 239

(56) References Cited

U.S. PATENT DOCUMENTS 5,715,237 A * 2/1998 Akiyoshi .................... 370/228
5,838,924 A  11/1998 Anderson et al.

OTHER PUBLICATIONS

"Performance and Fault Management Functions For The Maintenance of SONET/SDH and ATM Transport Networks", J.G. Gruber, IEEE May 23, 1993.
"Management Of ATM Port Relay Systems", Alex Gillespie, IEEE Nov. 14, 1995.
"Making The Most Of ATM With UTOPIA", Pierre Langlois.
"Implementation Of Self–Healing Function In ATM Networks Based On Virtual Path Concept", Ryutaro Kawamurs, et al., IEEE, Apr. 2, 1995.
"A Single–Chip Controller For 1.2 Gbps Shared Buffer ATM Switches", Nobuyuki Mizukoshi, et al., Custom Integrated Circuits Conference May 5, 1997.

(List continued on next page.)

Primary Examiner—Steven H. D Nguyen
(74) Attorney, Agent, or Firm—Cohen, Pontani, Lieberman & Pavane

(57) ABSTRACT

The invention relates to a method and an ATM Network Element (ATM NE-1) for automatic protection switching of a Transmission Convergence Sublayer SubNetwork Connection TCS SNC. In order to provide a simple protection scheme which is suitable to work on ATM networks and able to match switching requirements of current transmission networks, the Network Element comprises a working Transmission Convergence Sublayer entity (TCS-W) as part of a first physical line interface and a protection Transmission Convergence Sublayer entity (TCS-P) as part of a second physical line interface, both entities (TCS-W, TCS-P) being individually addressable within the ATM Network Element (ATM NE-1) via a UTOPIA address, the ATM Network Element (ATM NE-1) being provided by the Transmission Convergence Sublayer with physical layer error messages indicating failures in the TCS SNC established via the working Transmission Convergence Sublayer entity (TCS-W), the ATM Network Element (ATM NE-1) selecting for transmission the UTOPIA address (UA-1) of the working Transmission Convergence Sublayer entity (TCS-W) as long as no physical layer error message is received, otherwise the UTOPIA address (UA2) of the protection Transmission Convergence Sublayer entity (TCS-P), the ATM Network Element (ATM NE-1) merging the data entering the ATM Network Element (ATM NE-1) via both, working and protection Transmission Convergence Sublayer entity (TCS-W, TCS-P).

11 Claims, 8 Drawing Sheets

OTHER PUBLICATIONS

The Physical Layer www.eeng.dcu.ie/~murphyj/the/the/node6.html Printed Jun. 3, 2003 3 pages.
ATM Standards www.cne.gmu.edu/modules/atm/ATM-stand.html printed Jun. 3, 2003 3 pages.
William Stallings, *Local and Metropolitan Area Networks,* Fifth Edition, pp. 316–333 (1997).

The ATM Forum Technical Committee Utopia Specification Level 1, Version 2.01 af–phy–0017.000 Mar. 21, 1994.
International Telecommunication Union Series I: Integrated Services Digital Network Maintenance principles B–ISDN operation and maintenance principles and functions ITU–T Recommendation I.610 02/99.

* cited by examiner

ATM NETWORK ELEMENT AND METHOD FOR AUTOMATIC PROTECTION SWITCHING OF A TRANSMISSION CONVERGENCENCE SUBLAYER SUBNETWORK CONNECTION

FIELD OF THE INVENTION

The invention relates to an ATM Network Element enabling automatic protection switching of a Transmission Convergencence Sublayer SubNetwork Connection (TCS SNC). The invention equally relates to a method for automatic protection switching of a Transmission Convergencence Sublayer SubNetwork Connection between a first ATM Network Element and a second ATM Network Element.

BACKGROUND OF THE INVENTION

Transmission Convergencence Sublayer SubNetwork Connection are established between Transmission Convergence Sublayer entities of different ATM Network Elements of an ATM network, the Transmission Convergence Sublayer entities providing as part of the physical line interfaces of the ATM Network Elements access to physical transmission paths.

Protection schemes based on Synchronous Digital Networks (SDH) are well known in the art. They provide quick switch reaction to failures and short recovery times.

The use of the protection schemes based on the use of SDH and/or PDH transmission functions in an ATM Network, however, has the disadvantage of requiring additional transmission equipment in addition to the ATM Network Elements.

A proposal for a protection scheme for ATM transport networks based on the use of the ATM layer can be found, e.g., in U.S. Pat. No. 5,838,924. This protection scheme makes use of a virtual path group transport architecture comprising a working route, a protection route, and VPG bridge and selector functions at each end of the routes. Defect type indication is to be provided by a new segment level OAM cell. In case a defect is detected in the VPG assigned to the working route, the receiving node switches for reception to the protection route.

Protection schemes based on the use of the ATM layer, however, are not able to yield a performance, in terms of failure recovery time, comparable to that of SDH transport networks.

SUMMARY OF THE INVENTION

It is an object of the invention to provide a simple protection scheme which is suitable to work on ATM networks and is able to match switching requirements of current transmission networks (about 50 ms).

This object is reached by an ATM Network Element enabling automatic protection switching of a Transmission Convergence Sublayer SubNetwork Connection (TCS SNC) and comprising at least one working Transmission Convergence Sublayer entity as part of a first physical line interface and at least one protection Transmission Convergence Sublayer entity as part of a second physical line interface, both entities, respectively, being individually addressable within the ATM Network Element via an assigned UTOPIA address, the ATM Network Element being provided by the Transmission Convergence Sublayer with physical layer error messages indicating failures in the Transmission Convergence Sublayer SubNetwork Connection established via the working Transmission Convergence Sublayer entity, the ATM Network Element being configured to select for transmission of ATM-cells the UTOPIA address of the working Transmission Convergence Sublayer entity as long as no physical layer error message is received, and, after reception of a physical layer error message, the UTOPIA address of the protection Transmission Convergence Sublayer entity, and the ATM Network Element being configured to merge the data entering the ATM Network Element via both, the working Transmission Convergence Sublayer entity and the protection Transmission Convergence Sublayer entity.

The object is equally reached by a Method for automatic protection switching of a Transmission Convergencence Sublayer SubNetwork Connection (TCS SNC) between a first ATM Network Element and a second ATM Network Element in an ATM network, each ATM Network Element comprising at least one working Transmission Convergence Sublayer entity as part of a first physical line interface and at least one protection Transmission Convergence Sublayer entity as part of a second physical line interface, said working Transmission Convergence Sublayer entities of first and second ATM Network Element and said protection Transmission Convergence Sublayer entities of first and second ATM Network Element enabling independent Transmission Convergencence Sublayer SubNetwork Connections via different transmission paths, each of the Transmission Convergence Sublayer entities being addressable within the first and the second ATM Network Element respectively via a dedicated UTOPIA address, and each Transmission Convergence Sublayer entity providing physical layer error messages indicating failures in the Transmission Convergencence Sublayer SubNetwork Connection, the method comprising the steps of:

as long as no failure in the used Transmission Convergencence Sublayer SubNetwork Connection is indicated by a provided physical layer error message,
 a) transmitting data from the first ATM Network Element employed as source point via the corresponding working Transmission Convergence Sublayer entity, selected by its assigned UTOPIA address; and
if a physical layer error message indicating a failure in the used Transmission Convergencence Sublayer SubNetwork Connection is provided by the working Transmission Convergence Sublayer entity of the second ATM Network Element:
 b) transmitting a failure message to the first ATM Network Element;
 c) changing the UTOPIA address used for addressing ATM cells to be transmitted to a Transmission Convergence Sublayer entity in the first ATM Network Element from the UTOPIA address assigned to the working Transmission Convergence Sublayer entity to the UTOPIA address assigned to the protecting Transmission Convergence Sublayer entity;
 d) transmitting ATM cells from the first ATM Network Element via the corresponding protection Transmission Convergence Sublayer entity selected by its assigned UTOPIA address; and
regardless of whether the working or the protection Transmission Convergence Sublayer entity is used for transmission in the first ATM network element,
 e) merging all data received via working Transmission Convergence Sublayer entity and protection Transmission Convergence Sublayer entity of the second ATM Network Element employed as sink.

The invention proceeds from the fact that in ATM networks, typically, ATM Network Elements use UTOPIA addresses to identify independent Physical layers and, hence Transmission Convergence Sublayer entities or Service Access Points which give service to the ATM layer. Moreover, the invention takes advantage of that the Transmission Convergence Sublayer, within the Physical layer of the ATM protocol stack, offers alarms and monitoring functions which are an extension of those of High Order Transmission Path of SDH and/or PDH transport networks. These alarm and monitoring functions have been standardized by ITU-T Recommendation I.610, which describes different operation and maintenance (OAM) flows (F1–F6). The physical layer contains the three lowest OAM levels, OAM flow F3 being allocated to the transmission path level.

The ATM Network Element and the method according to the invention make use of those functions to trigger protection scheme actions on the Transmission Convergence Sublayer of ATM Network Elements by performing switching of UTOPIA addresses within the ATM Network Element for transmission of ATM cells. Internal UTOPIA addresses are therefore handled to switch quickly from the working Transmission Convergence sublayer entity to the provided protection Transmission Convergence sublayer entity. This scheme allows to associate a protection physical line interface to a working physical line interface to perform Transmission Convergence Sublayer SubNetwork Connection protection with inherent or non-intrusive monitoring (TCS SNC/I or TCS SNC/N).

It is an advantage of the ATM Network Element and the method of the invention that they enable a protection scheme yielding a very short recovery time, since it is only necessary to change the UTOPIA address at the source point of the traffic in case of a reported failure. No operation is required at the ATM layer neither in the source nor the sink points.

The switching function is triggered by the detection of standard alarms, in particular standard alarms in the F3 OAM flow. No ad-hoc automatic protection switching protocol is required.

It is a further advantage that the protection mechanisms according to the invention is based on the use of Transmission Convergence Sublayer functions suitable to be implemented in ATM networks without the need to employ additional PDH or SDH transmission equipment.

The proposed protection scheme may be considered as an extension of high order path SubNetwork Connection protection and it is a simplified way to implement protection schemes in ATM networks.

The proposed merging at the sink point of an ATM Network Element is possible due to the fact that during normal operation no cell is sent to the ATM layer by the protection Transmission Convergence Sublayer SubNetwork Connection and that no cell is sent to the ATM layer by the working Transmission Convergence Sublayer SubNetwork Connection when the underlying physical line is in failure.

The proposed switching at the source point in case of received error messages and the merging at the sink point make the permanent transmission of data via two different TSC SNCs for an effective protection superfluous.

Advantageously, a dual ended switching is employed. Both directions of transmission are switched from working to protection Transmission Convergence Sublayer entities even after a solely unidirectional failure or signal degrade condition. The coordination of switches relies on the use of the OAM F3 flow and does not require any APS protocol.

Since Transmission Convergence Sublayer functions are implemented on all types of physical line interfaces of ATM Network Elements, TCS SNC protection scheme is applicable to all types of physical line interfaces, in particular SDH or PDH, including the cases where Inverse Multiplexing for ATM (IMA) is used over PDH links.

In a preferred embodiment the features of the TCS SNC scheme are extended to protect Virtual Path Connections which coincide with the span of the Transmission Convergence Sublayer. This is done by associating a protection Virtual Path Connection which terminates on the same access point as the TCS SNC to the working Transmission Convergence Sublayer. This implies that the TCS SNC protection switching scheme is able to protect Virtual Path Connections which are established between adjacent ATM Network Elements. In a ring topology, the protection virtual path contains intermediate ATM Network Elements. The working and protecting Virtual Path Connection must include the merging functionality on the sink termination points. The protection Virtual Path Connection is set up simultaneously with the working Virtual Path Connection by means of the management plane.

Equally, Virtual Circuit Connections may be protected.

Preferably, a revertive operation is chosen for the method according to the invention. This means that the traffic on the protection Transmission Convergence Sublayer entity shall be switched back to the working Transmission Convergence Sublayer entity when it has recovered from a fault or signal degrade condition. This characteristic is needed to be able to protect Virtual Path Connections which coincide with the span of the Transmission Convergence Sublayer (Virtual Path Connection within adjacent ATM Network Element).

In order to enable a revertive operation, the possibility of setting a Wait To Restore condition is provided. In this condition, the working Transmission Convergence SubNetwork Connection meets the restoration threshold after a fault or signal degrade condition. It therefore indicates that the transport of working traffic is ready to be reverted to the working Transmission Convergence SubNetwork Connection from the protection Transmission Convergence SubNetwork Connection.

The ATM Network Element and the method of the invention may associate heterogeneous physical line interfaces to provide protection on point to point connections and loop network scenarios. The protection scheme is applicable to more complicated network scenarios such as rings due to the merging at the sink point.

The ATM Network Element and the method according to the invention are especially intended for the use in the scope of a Radio Access Network of the WCDMA (Wideband Code Division Multiple Access) Third Generation Networks.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

Preferred embodiments of the invention are described in more detail with reference to drawings of which.

DETAILED DESCRIPTION OF THE PRESENTLY PREFERRED EMBODIMENTS

Figure 1:
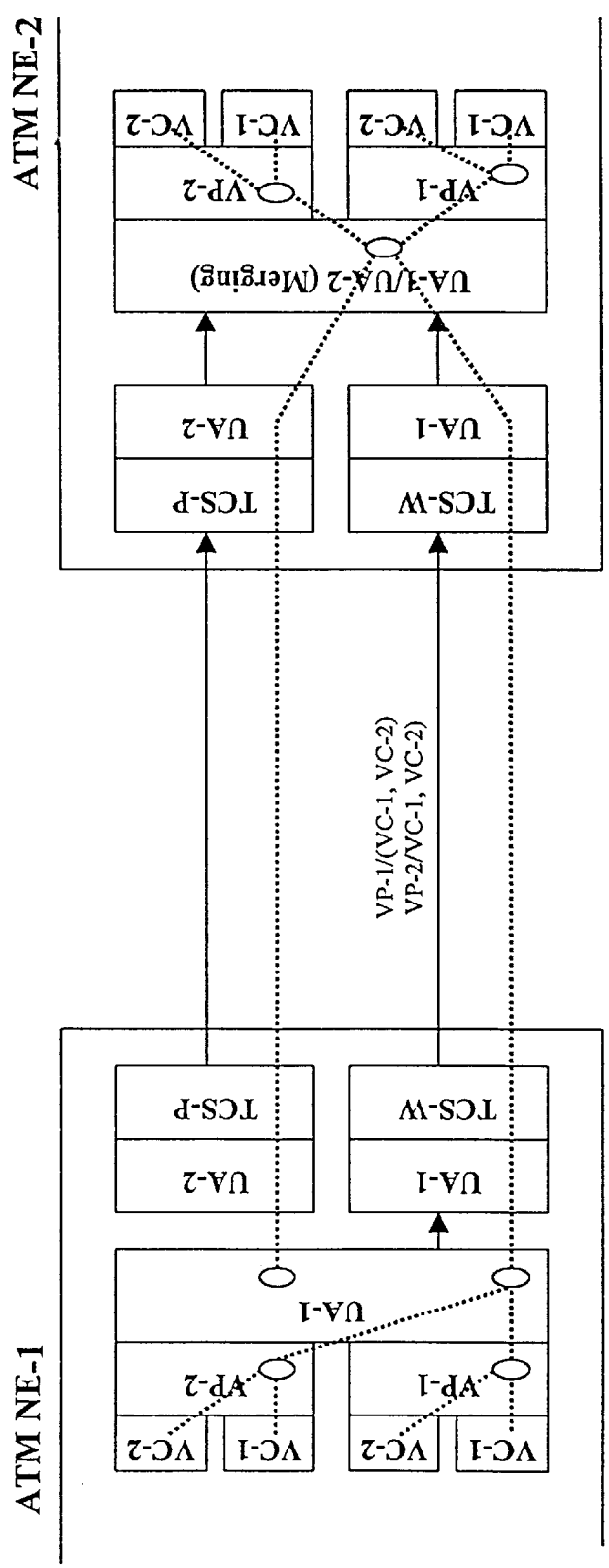
FIG. 1 shows a 1+1 scenario during normal operation.
Figure 2:
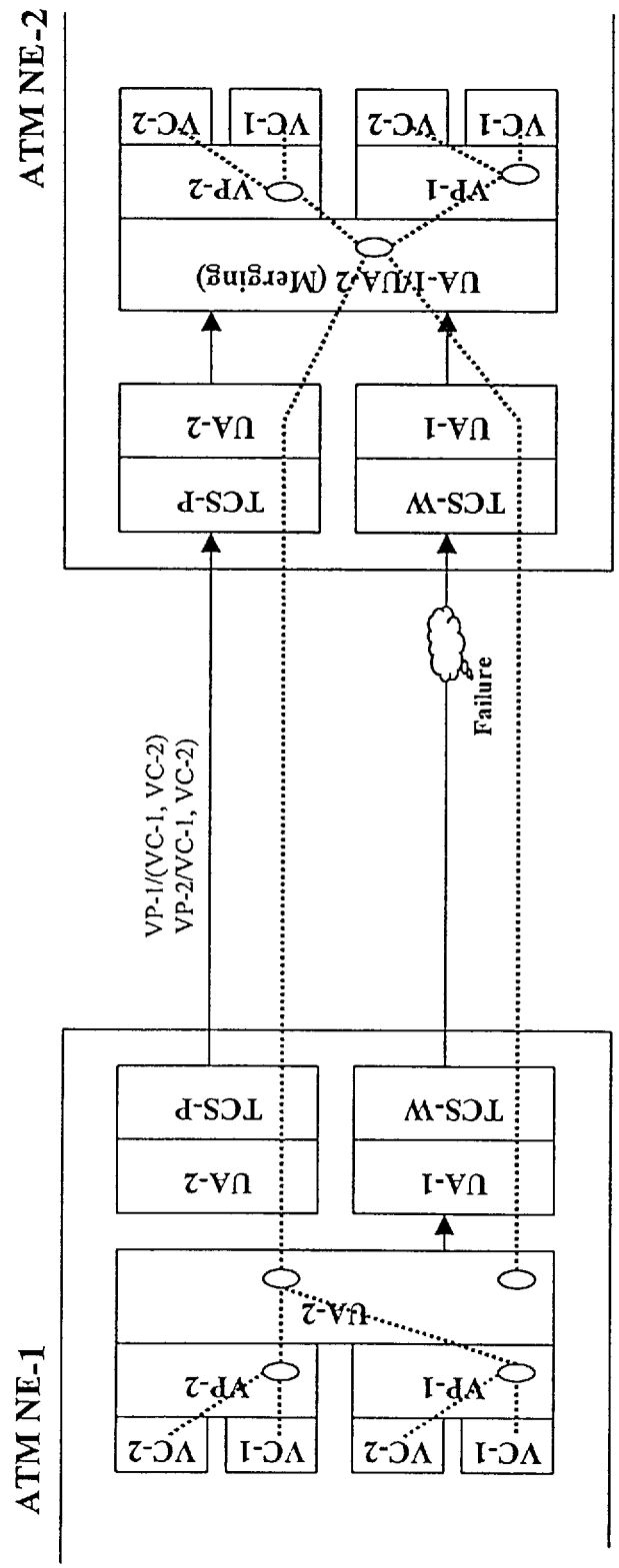
FIG. 2 shows a 1+1 scenario when a failure occurs.

FIG. 1 and FIG. 2 both schematically show a part of an ATM-network. The depicted part of the network includes part of two ATM Network Elements ATM NE1, ATM NE2 according to the invention interconnected by a working and a protection transmission path. Both ATM Network Elements ATM NE1, ATM NE2 comprise a working Transmission Convergence Sublayer entity TCS-W as part of a first physical line interface (PHY) and a protection Transmission Convergence Sublayer entity TCS-P as part of a second physical line interface, providing access to the different transmission paths. Working Transmission Convergence Sublayer entity TCS-W and protection Transmission Convergence Sublayer entity TCS-P are accessible within their ATM Network Elements ATM NE1 and ATM NE2 via a UTOPIA interface for establishing virtual path VP-1,VP-2 connections. In this example, each virtual path VP-1,VP-2 connection is supporting two virtual circuit VC-1,VC-2 connections.

The working Transmission Convergence Sublayer entities TCS-W can be addressed within the respective ATM Network Element ATM NE1,NE2 via a first UTOPIA address UA1 and the protection Transmission Convergence Sublayer entities TCS-P can be addressed within the respective ATM Network Element ATM NE1,NE2 via a second UTOPIA address UA2. Although the transmission between the ATM Network Elements ATM NE1, ATM NE2 is supposed to be bidirectional, only one direction of transmission is indicated and described: the first ATM Network Element ATM NE1 is shown only as source point and the second ATM Network Element ATM NE2 is shown only as sink point, i.e., transmission is taking place in direction from the first to the second ATM Network Element.

FIG. 1 represents a situation without failure in the Transmission Convergence Sublayer SubNetwork Connection (TCS SNC) between the two ATM Network Elements ATM NE1 and ATM NE2.

At the source point, here ATM Network Element NE1, all traffic coming from the virtual connections is sent to the working Transmission Convergence Sublayer entity TCS-W by selecting the dedicated first UTOPIA address UA1. The protected Transmission Convergence Sublayer entity TCS-P remains idle.

Accordingly, the traffic is only transmitted over the working Transmission Convergence Sublayer SubNetwork Connection from working Transmission Convergence Sublayer entity TCS-W of the first ATM Network Element ATM NE-1 to the working Transmission Convergence Sublayer entity TCS-W of the second ATM Network Element ATM NE-2. The working transmission path carries the traffic of the first Virtual Path Connection, combining two Virtual Circuit Connections VP-1(VC-1,VC-2) and the traffic of the second Virtual Path Connection, also combining two Virtual Circuit Connections VP-2(VC-1,VC-2).

At the sink point, here ATM Network Element ATM NE-2, all the traffic entering via the working Transmission Convergence Sublayer entity TCS-W and the protection Transmission Convergence Sublayer entity TCS-P of the physical line interfaces of the second ATM Network Element NE-2 are merged into a single flow. This merging implies that Virtual Connections coming from working Transmission Convergence Sublayer entity TCS-W cannot be distinguished from those coming from protection Transmission Convergence Sublayer entity TCS-P. The merging point has actually a multipoint to point behavior.

FIG. 2 represents, in contrast to FIG. 1, a situation in which a failure has been detected in the Transmission Convergence Sublayer SubNetwork Connection.

As indicated in FIG. 2, the failure occurred at some place on the working transmission path.

At the source point, all traffic of the virtual connections is now sent to the protection Transmission Convergence Sublayer entity TCS-P instead of to the working Transmission Convergence Sublayer entity TCS-W by selecting the dedicated second UTOPIA address UA2. Consequently, the protection transmission path now carries all traffic VP-1 (VC-1,VC-2) and VP-2(VC-1,VC-2) that was before carried by the working transmission path.

Because of the merging, the configuration at the sink point does not have to be changed in a failure situation. As soon as the traffic is rerouted to the protection transmission path, it is automatically available again at the sink point.

The recovery time with this protection scheme is very short, since it is only necessary to change the UTOPIA address in the source point. By this change, all affected Virtual Path Connections and all Virtual Circuit Connections are recovered immediately.

The protection procedure for the transition of the situation depicted in FIG. 1 to the situation depicted in FIG. 2 will now be explained in more detail and for bidirectional transmissions with reference to FIGS. 3a and 3b.

Figure 3A:
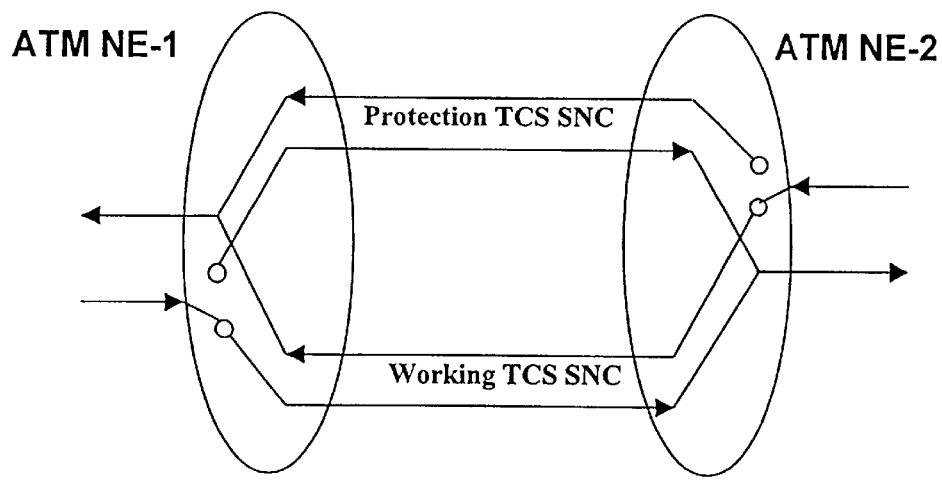
FIGS. 3a and 3b show the protection procedure in a 1+1 scenario.
Figure 3B:
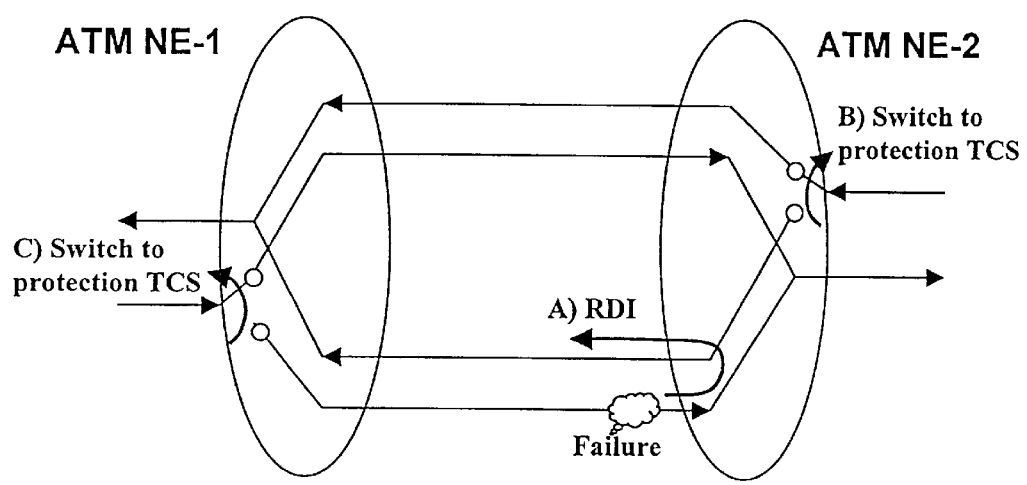

FIGS. 3a and 3b show a first and a second ATM Network Element ATM NE-1, ATM NE-2, connected via a working Transmission Convergence Sublayer SubNetwork Connection (TCS SNC) and a protection TCS SNC. In transmitting direction, either working or protection TCS SNC can be selected in the first and the second ATM Network Element ATM NE-1, ATM NE-2 by the corresponding UTOPIA address.

FIG. 3a) shows bidirectional transmission during normal operation. In their source function, both ATM Network Elements ATM NE-1, ATM NE-2 transmit only via the working TCS SNC represented in the lower part of the figure. In their sink function, both ATM Network Elements ATM NE1, ATM NE2 merge the data received via working and protection TCS SNC, no data coming in from the protection transmission path at that time.

In FIG. 3b, a failure was detected in the second ATM Network Element ATM NE-2 with regard to its function as sink point, resulting in the generation of a P-AIS defect indication, or other alarms such as Loss Of Cell Delineation (LOCD), LOP etc., at F3 OAM level according to ITU-T Recommendation I.610. Transmission path-AIS towards the TCS sink point defect indications result from defects observed at the regenerator section, multiplex section or transmission path levels.

As consequence of the P-AIS and/or LOCD, LOP etc. signal, a path remote defect indication (P-RDI) signal is generated at the F3 OAM level according to ITU-T Recommendation I.610 and transmitted back to the first ATM Network Element ATM NE1 (A).

Moreover, ATM Network Element NE-2 as source point switches to the protection TCS SNC for the reverse transmission direction (B).

Upon detection of the P-RDI signal, also the first ATM Network Element ATM NE1 switches to the protection TCS SNC in the direction of the failure (C).

Now, both ATM Network Elements ATM NE1, ATM NE2 transmit via the protection TCS SNC.

The described TCS SNC protection scheme is bidirectional, i.e. it comprises a Dual Ended Switching. The coordination of the protection switching on both ends is accomplished by the Fault Management OAM protocol at the F3 level, making use of P-AIS or LOCD or LOP to indicate a signal failure on the incoming signal and P-RDI indicating a signal defect reported by the remote end. The Dual Ended Switching feature is needed to guarantee that protection switching takes place even when the failure affects both directions of transmission. In this case, both Transmission Convergence Sublayer ends detect P-AIS, LOCD and/or LOP instead of P-RDI one of the Transmission Convergence Sublayer ends and P-AIS, LOCD and/or LOP the other.

To this end, a working Transmission Convergence Sublayer entity switches to the protection Transmission Convergence Sublayer entity both, upon detection of signal failure on the incoming signal (P-AIS, LOCD and/or LOP) or upon the detection of signal defect as reported by the remote end (P-RDI).

Failures in the TCS SNC leading to a OAM F3 flow failure signal may be loss of signal, loss of frame or loss of cell delineation.

A more complex example of the use of the protection scheme according to the invention is shown in FIGS. 4 to 8, depicting a ring topology in a radio access network (RAN).

The ring is made up of four ATM Network Elements NE-1,NE-2,NE-3,NE-4, connected by transmission paths. Each of the Network Elements comprises two Transmission Convergence Sublayer entities TCS-1,TCS-2, each providing an access to one of the two associated physical transmission paths. Within the respective Network Element, the Transmission Convergence Sublayer entities TCS-1,TCS-2 are connected via a UTOPIA interface with three virtual path VP-1,VP-2,VP-3 entities. Via a Virtual Path Transmission Control Protocol VP TCP, Network Elements NE-1,NE-2, NE-3 give access to three base stations and Network Element NE-4 gives service to the RNC.

Figure 4:
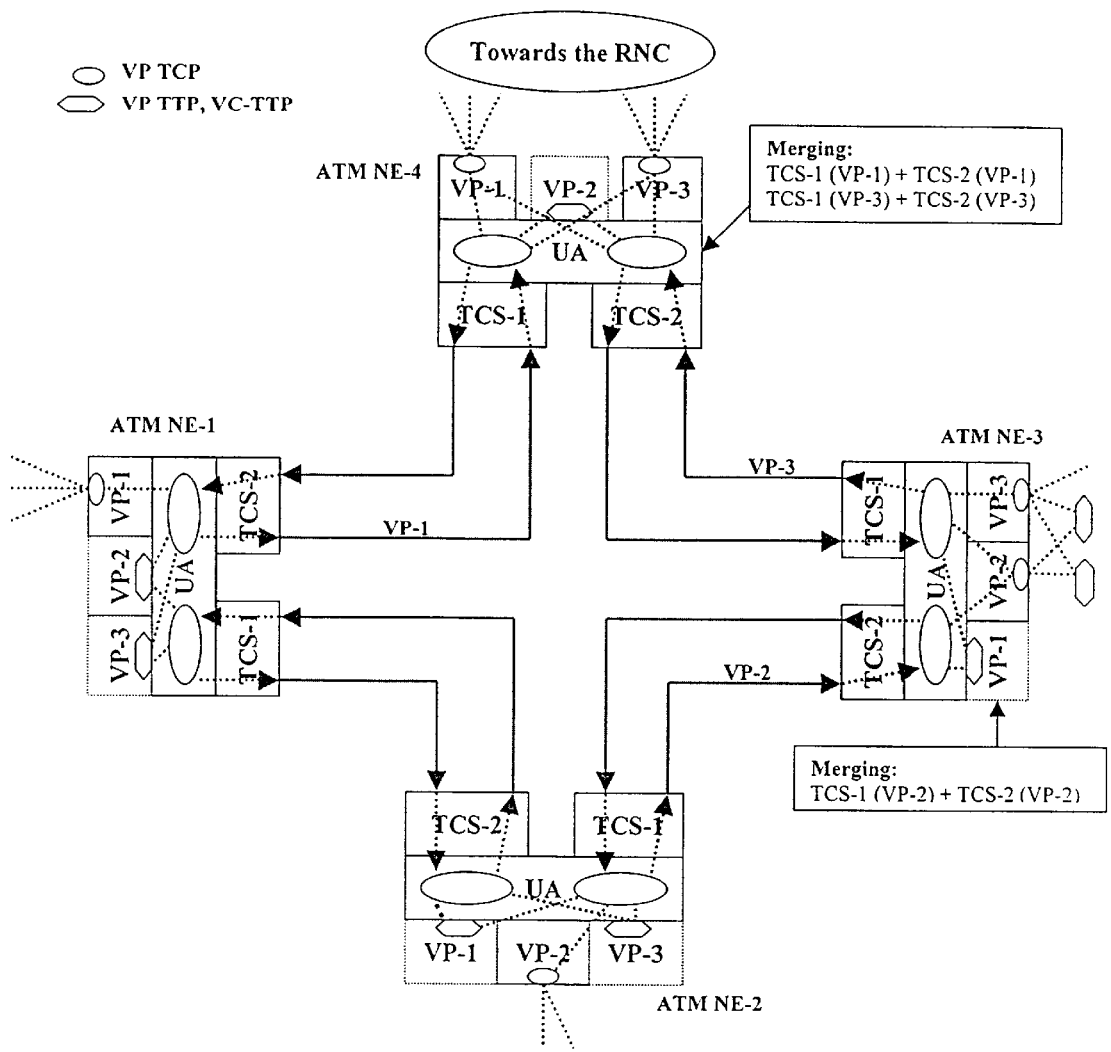
FIG. 4 shows a the transport of ATM Virtual Connections over a ring in first directions during normal operation.
Figure 5:
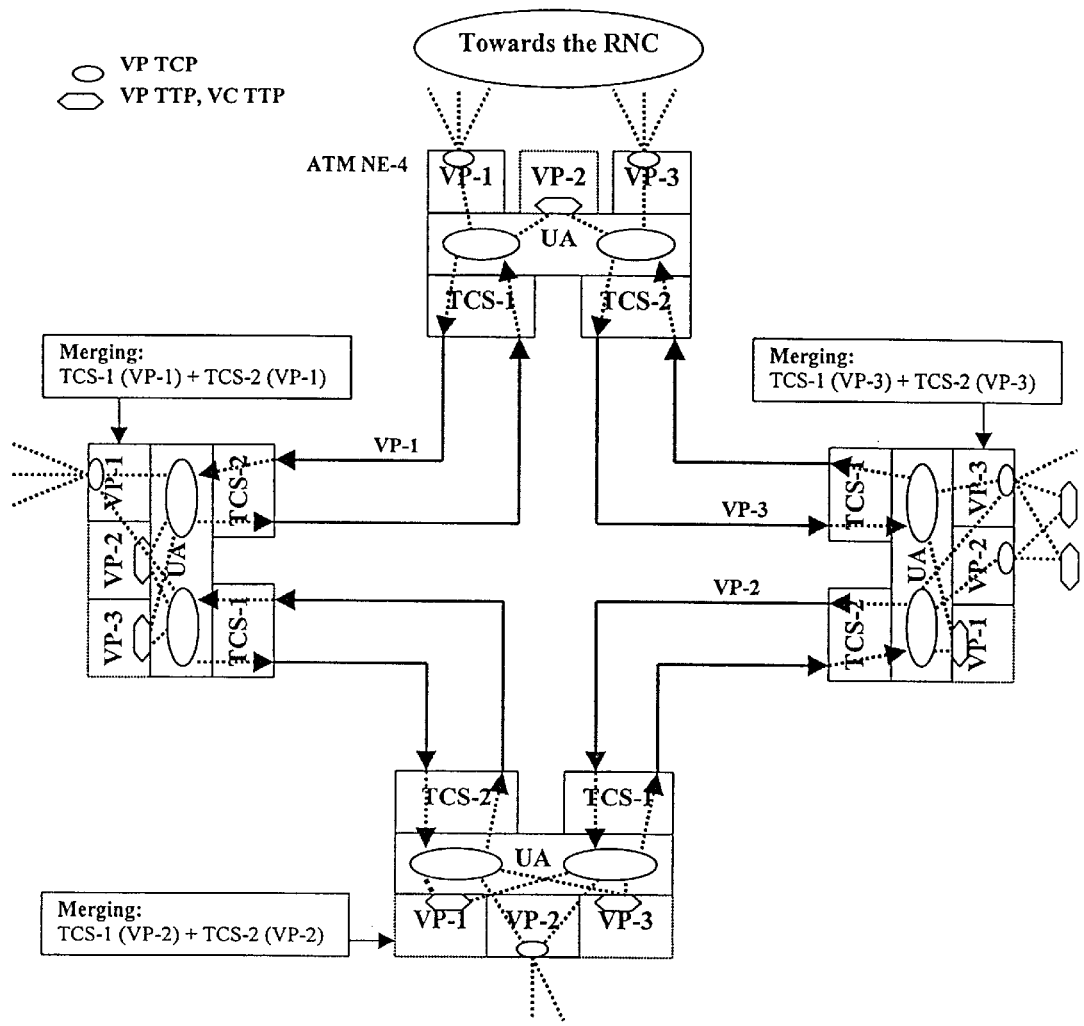
FIG. 5 shows a the transport of ATM Virtual Connections over a ring in second directions during normal operation.

FIGS. 4 and 5 show the Virtual Path Connections during normal operation, in which they coincide with the TCS SNCs. For the sake of clarity, the directions of transmission have been separated and depicted in two figures.

The example presents the ATM network characteristics of the Radio Access Network (RAN) for third generation networks (TGN). Virtual Path Connections VPC interconnect adjacent ATM Network Elements. In detail, VP-1 interconnects Network Elements NE-1 and NE-4, VP-2 interconnects Network Elements NE-2 and NE-3, VP-3 interconnects Network Elements NE-3 and NE-4. Virtual Circuit Connections VCC interconnect, end-to-end, each base stations with the RNC. For this reason, ATM Network Element NE-3 implements Virtual Circuit Trail Termination Points VC TTP to transport the Virtual Circuit Connections extracted from Virtual Path VP-2 into Virtual Path VP-3.

Figure 6C:
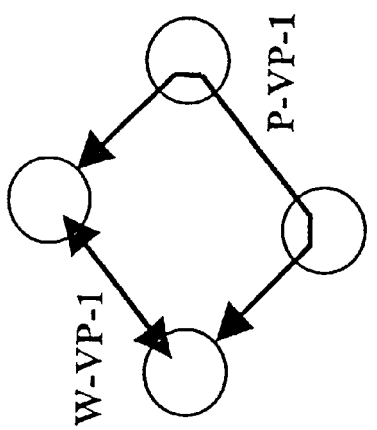
FIGS. 6a to 6c show alternative transport routes for the connections of FIGS. 4 and 5 in case of a failure.
Figure 6B:
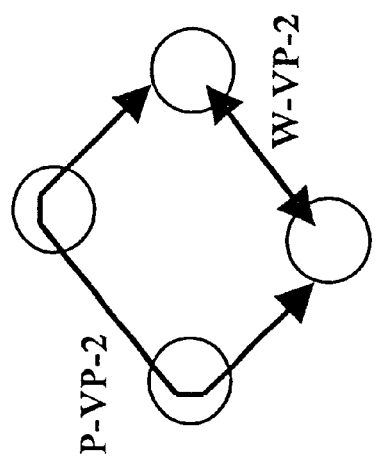
Figure 6A:
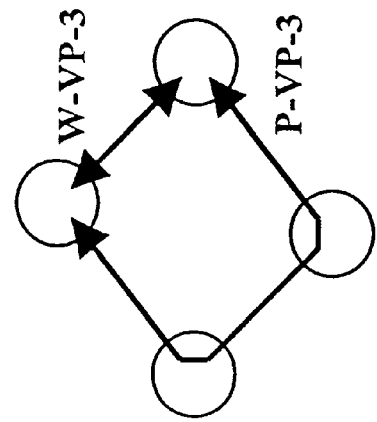

In order to enable an automatic switching scheme according to the invention, a protection Virtual Path Connection is defined for each working Virtual Path Connection. Working Virtual Paths W-VP-1,W-VP-2,W-VP-3 and corresponding Protection Virtual Paths P-VP-1,P-VP 2,P-VP-3 are schematically shown in FIGS. 6a, 6b and 6c for the three exemplary Virtual Path VP-1,VP-2,VP-3 Connections.

Unlike the working Virtual Path Connections, the protection Virtual Path Connections do not interconnect adjacent ATM Network Elements. This is an important difference which implies the use of a revertive protection feature. For providing a protection path that is composed of several TCS SNCs, each ATM Network Element NE-1,NE-2,NE-3,NE-4 must implement Virtual Path crossconnections (VP TTP) via which the respective traffic is forwarded to the next ATM Network Element NE-1,NE-2,NE-3,NE-4. The protection Virtual Path Connections do not transport any traffic under normal conditions. However, they must be set up simultaneously with the working Virtual Path Connections in order to guarantee the proper operation of the TCS SNC protection scheme.

In each ATM Network Element NE-1,NE-2,NE-3,NE-4, the incoming data from the working Virtual Path Connection and the protection Virtual Path Connection for which the respective ATM Network Element is sink point, is merged. For example, for supplying data to the RNC, in ATM Network Element NE-4, the Virtual Path VP-1 data coming in via Transmission Convergence Sublayer entity TCS-1 and via Transmission Convergence Sublayer entity TCS-2 are merged as well as the virtual path VP-3 data coming in via Transmission Convergence Sublayer entity TCS-1 and via Transmission Convergence Sublayer entity TCS-2.

Figure 7:
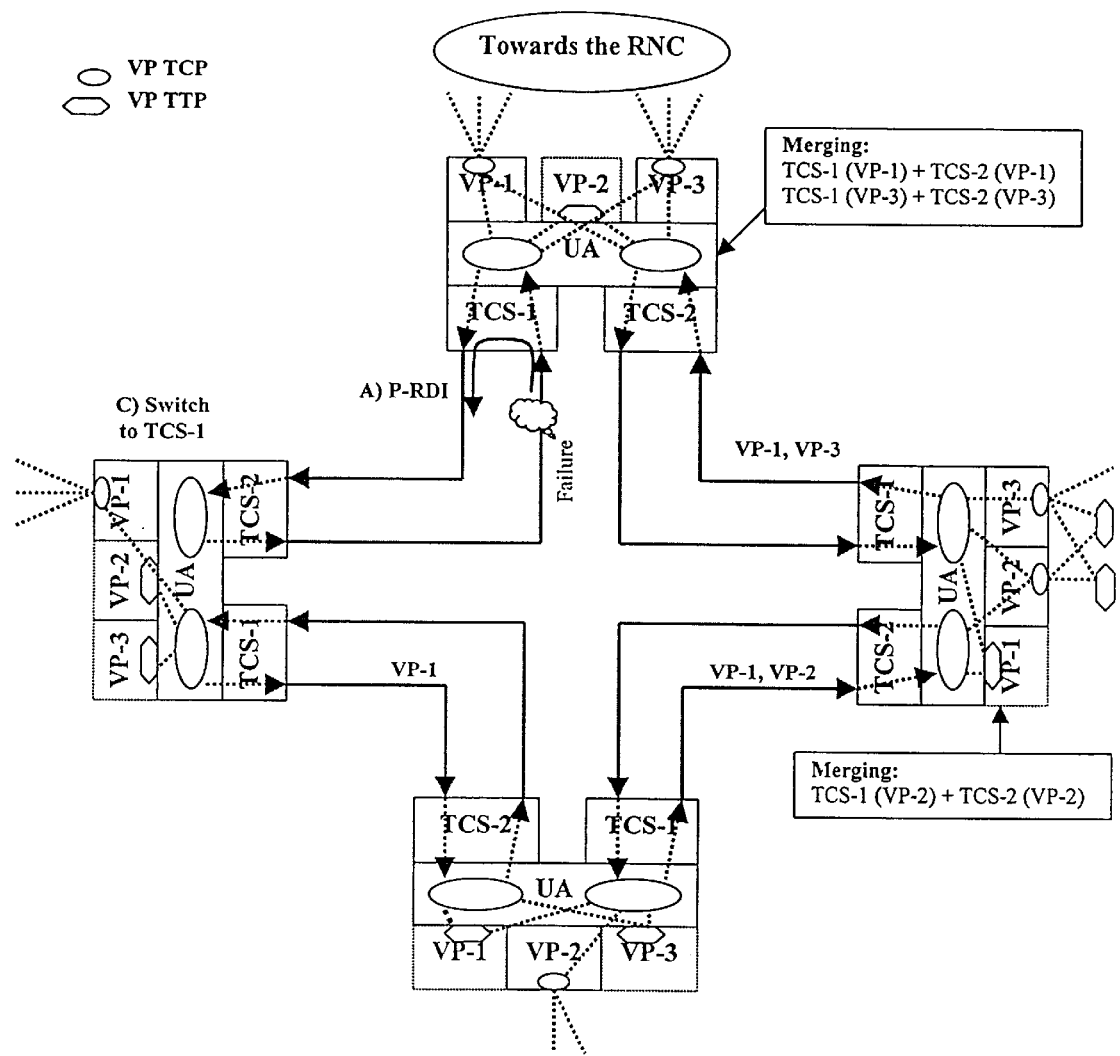
FIG. 7 shows corresponding to the normal operation of FIG. 4 an example of the transport of ATM Virtual Connections over a ring in a failure situation.
Figure 8:
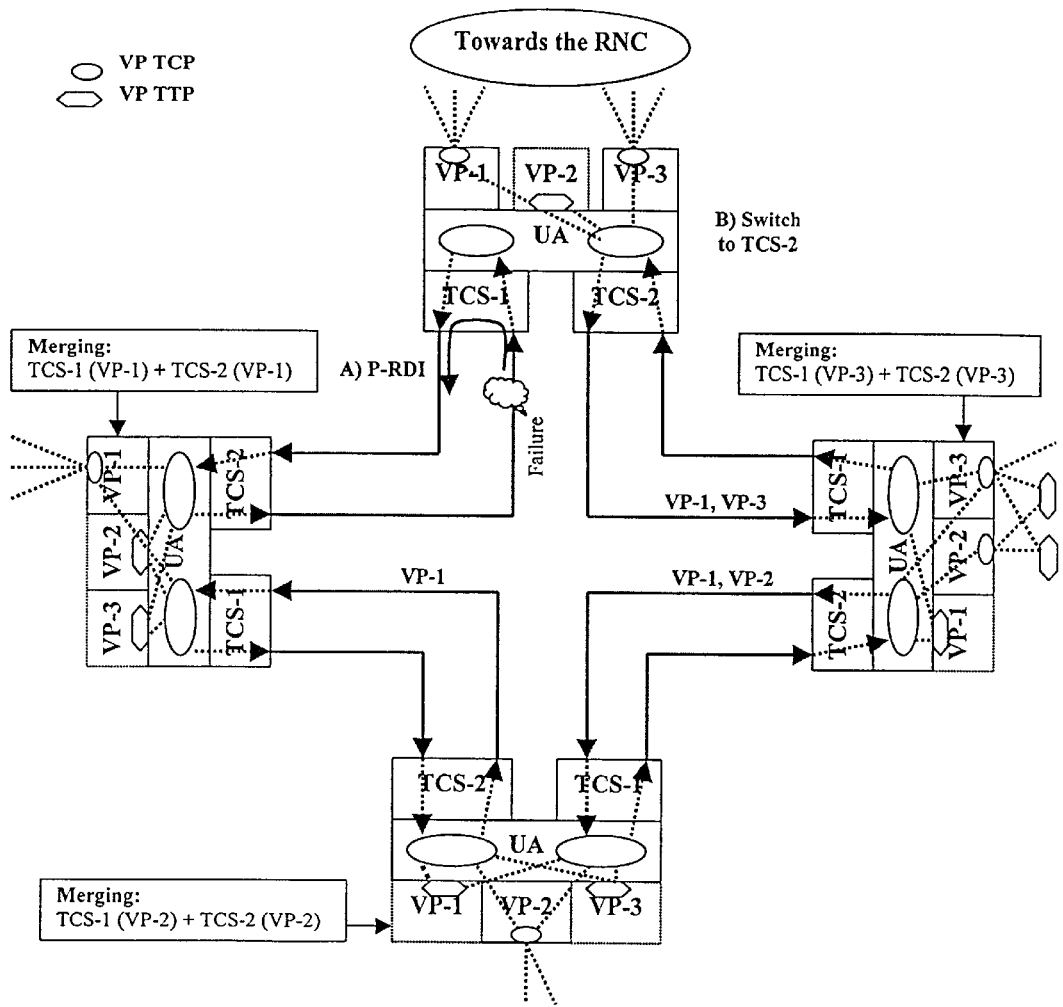
FIG. 8 shows corresponding to the normal operation of FIG. 5 an example of the transport of ATM Virtual Connections over a ring in a failure situation.

FIGS. 7 and 8 show the ring structure of FIGS. 4 and 5 with a failure on the transmission path from ATM Network Element NE-1 to ATM Network Element NE-4, affecting thereby the working Virtual Path VP-1. The switching to the protection transmission path takes place as described with regard to the point to point connection.

A signal failure signal P-AIS and a remote defect indication (P-RDI) signal is generated at the F3 OAM level according to ITU-T Recommendation I.610 (A).

Upon detection of the P-RDI signal, ATM Network Element NE-1 switches as source point to the protection Transmission Convergence sublayer entity TCS-1 by changing the UTOPIA address (C). The resulting protection Virtual Path VP-1 from ATM Network Element NE-1 to the RNC is depicted in FIG. 7: Traffic entering ATM Network Element NE-1 from the base station via a Virtual Path Transmission Control Protocol VP-1 TCP is passed on to TCS-1 of ATM Network Element NE-1; further to TCS-2, VP-1 TTP and TCS-1 of ATM Network Element NE-2; further to TCS-2, VP-1 TTP and TCS-1 of ATM Network Element NE-3; further to TCS-2 of ATM Network Element NE-4 and finally via virtual path transmission control protocol VP-1 TCP of ATM Network Element NE-4 to the RNC. The TCS SNC from ATM Network Element NE-2 to ATM Network Element NE-3 is used in common with working Virtual Path VP-2 and the TCS SNC from ATM Network Element NE-3 to ATM Network Element NE-4 is used in common with working virtual path VP-3.

Within ATM Network Elements NE-2 and NE-3, virtual path crossconnections VP-1 TTP provide for the forwarding of the data to the respective protection Transmission Convergence Sublayer entity TCS-1.

The generated P-AIS signal causes ATM Network Element NE-4 to switch to the protection Transmission Convergence Sublayer entity TCS-2 (B). The resulting protection Virtual Path VP-1 from RNC to the ATM Network Element NE-1 is depicted in FIG. 8.

The composed protection Virtual Paths VP-1 in FIGS. 7 and 8 correspond to the protection Virtual Path P-VP-1 in FIG. 6a).

ATM Network Element NE-1 and NE-4 as sink points respectively, receive the traffic from the protection Virtual Path VP-1 immediately after the switching of the Transmission Convergence Sublayer entities by ATM Network Elements NE-4 and NE-1 as source points, since the traffic received via the respective Transmission Convergence Sublayer entities TCS-1,TCS-2 are continuously merged.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. ATM Network Element (ATM NE-1) enabling automatic protection switching of a Transmission Convergence Sublayer SubNetwork Connection and comprising at least one working Transmission Convergence Sublayer entity (TCS-W) as part of a first physical line interface and at least one protection Transmission Convergence Sublayer entity (TCS-P) as part of a second physical line interface, both entities (TCS-W,TCS-P), respectively, being individually addressable within the ATM Network Element (ATM NE-1) via an assigned UTOPIA address, the ATM Network Element (ATM NE-1) being provided by the Transmission Convergence Sublayer with physical layer error messages indicating failures in the Transmission Convergence Sublayer SubNetwork Connection established via the working Transmission Convergence Sublayer entity (TCS-W), the ATM Network Element (ATM NE-1) being configured to select for transmission of ATM-cells the UTOPIA address (UA1) of the working Transmission Convergence Sublayer entity (TCS-W) as long as no physical layer error message is received, and to switch the selection, after reception of a physical layer error message, to the UTOPIA address (UA2) of the protection Transmission Convergence Sublayer entity (TCS-P), thereby providing automatic protection switching of the Transmission Convergence Sublayer SubNetwork Connection without requiring an action in an ATM layer of the ATM network element (ATM NE-1) and the ATM Network Element (ATM NE-1) being configured to merge the data entering the ATM Network Element (ATM NE-1) via both, the working Transmission Convergence Sublayer entity (TCS-W) and the protection Transmission Convergence Sublayer entity (TCS-P).

2. ATM Network Element (ATM NE-1) according to claim 1, wherein the physical line interfaces are SDH and/or PDH physical line interfaces.

3. ATM Network Element (ATM NE-1) according to claim 2, wherein the physical line interfaces are PDH physical line interfaces used for inverse multiplexing for ATM (IMA).

4. ATM Network Element (ATM NE-1) according to claim 1, wherein the physical layer error messages are OAM physical layer error messages including at least one of OAM flow F3 messages and P-RDI and P-AIS messages indicating a detected loss of signal, loss of frame and/or loss of cell delineation.

5. ATM-Network comprising at least two interconnected ATM Network Elements (ATM NE-1) according to claim 1.

6. Method for automatic protection switching of a Transmission Convergence Sublayer SubNetwork Connection between a first ATM Network Element (ATM NE1) and a second ATM Network Element (ATM NE2) in an ATM network, each ATM Network Element (ATM NE1,NE2) comprising at least one working Transmission Convergence Sublayer entity (TCS-W) as part of a first physical line interface and at least one protection Transmission Convergence Sublayer entity (TCS-P) as part of a second physical line interface, said working Transmission Convergence Sublayer entities (TCS-W) of first and second ATM Network Element (ATM NE1,NE2) and said protection Transmission Convergence Sublayer entities (TCS-P) of first and second ATM Network Element (ATM NE1,NE2) enabling independent Transmission Convergence Sublayer SubNetwork Connections via different transmission paths, each of the Transmission Convergence Sublayer entities (TCS-W,TCS-P) being addressable within the first and the second ATM Network Element (ATM NE) respectively via a dedicated UTOPIA address, and each Transmission Convergence Sublayer entity (TCS-W,TCS-P) providing physical layer error messages indicating failures in the Transmission Convergence Sublayer SubNetwork Connection, the method comprising the steps of:

as long as no failure in the used Transmission Convergence Sublayer SubNetwork Connection is indicated by a provided physical layer error message,
a) transmitting data from the first ATM Network Element (ATM NE-1) employed as source point via the corresponding working Transmission Convergence Sublayer entity (TCS-W), selected by its assigned UTOPIA address; and if a physical layer error message indicating a failure in the used Transmission Convergencence Sublayer SubNetwork Connection is provided by the working Transmission Convergence Sublayer entity (TCS-W) of the second ATM Network Element (ATM NE-2)
b) transmitting a failure message to the first ATM Network Element (ATM NE-1);
c) changing the UTOPIA address used for addressing ATM cells to be transmitted to a Transmission Convergence Sublayer entity in the first ATM Network Element (ATM NE-1) from the UTOPIA address (UA1) assigned to the working Transmission Convergence Sublayer entity (TCS-W) to the UTOPIA address (UA2) assigned to the protecting Transmission Convergence Sublayer entity (TCS-P), whereby said step of changing does not require an action in an ATM layer of the first ATM Network Element (ATM NE1); and
d) transmitting ATM cells from the first ATM Network Element (ATM NE-1) via the corresponding protection Transmission Convergence Sublayer entity (TCS-P) selected by its assigned UTOPIA address; and regardless of whether the working or the protection Transmission Convergence Sublayer entity (TCS-W,TCS-P) is used for transmission in the first ATM network element,
e) merging all data received via working Transmission Convergence Sublayer entity (TCS-W) and protection Transmission Convergence Sublayer entity (TCS-P) of the second ATM Network Element (ATM NE) employed as sink.

7. Method for automatic protection switching of a Transmission Convergence Sublayer SubNetwork Connection according to claim 6, wherein the switching takes place also at second ATM Network Element (ATM NE-2) in its source function.

8. Method for automatic protection switching of a Transmission Convergence Sublayer SubNetwork Connection according to claim 6, wherein the switching is reversed as soon as the failure is removed.

9. Method for automatic protection switching of a Transmission Convergence Sublayer SubNetwork Connection according to claim 6, wherein after switching to the protection Transmission Convergence SubNetwork Connection because of a fault condition, the working Transmission Convergence SubNetwork Connection is set to a Wait To Restore condition as soon as the fault condition is removed.

10. Method for automatic protection switching of a Transmission Convergence Sublayer SubNetwork Connection according to claim 6, further comprising the additional steps in case an OAM physical layer error message indicating a failure in the used Transmission Convergence Sublayer SubNetwork Connection is provided by the working Transmission Convergence Sublayer entity (TCS-W) of the second ATM Network Element (ATM NE-2):

changing also in the second ATM Network Element (ATM NE-2) in its function as source point the UTOPIA address used for addressing ATM cells to be transmitted to a Transmission Convergence Sublayer entity in the second ATM Network Element (ATM NE-2) from the UTOPIA address (UA1) assigned to the working Transmission Convergence Sublayer entity (TCS-W) to the UTOPIA address (UA2) assigned to the protecting Transmission Convergence Sublayer entity (TCS-P)

transmitting ATM cells from the second ATM Network Element (ATM NE-2) via the corresponding protection Transmission Convergence Sublayer entity (TCS-P) selected by its assigned UTOPIA address to the first ATM Network Element (ATM NE-1).

11. Method for automatic protection switching of a Transmission Convergence Sublayer SubNetwork Connection according to claim 6, wherein the used physical layer error messages are flow F3 OAM messages including at least one of Path-RDI and Path-AIS, as indication of a detected loss of signal, loss of frame and/or loss of cell delineation.

* * * * *

UNITED STATES PATENT AND TRADEMARK OFFICE
CERTIFICATE OF CORRECTION

PATENT NO. : 6,775,228 B1  Page 1 of 1
DATED : August 10, 2004
INVENTOR(S) : Juan Ignacio Solana De Quesada It is certified that error appears in the above-identified patent and that said Letters Patent is hereby corrected as shown below:

Title page,
Item [54], Title, should read -- ATM NETWORK ELEMENT AND METHOD FOR AUTOMATIC PROTECTION SWITCHING OF A TRANSMISSION CONVERGENCE SUBLAYER SUBNETWORK CONNECTION --

Signed and Sealed this

Tenth Day of May, 2005

JON W. DUDAS
*Director of the United States Patent and Trademark Office*